C. H. ANSCHUTZ.
LID FOR COOKING UTENSILS AND RETAINING DEVICE THEREFOR.
APPLICATION FILED MAY 1, 1915.
1,207,699.
Patented Dec. 12, 1916.
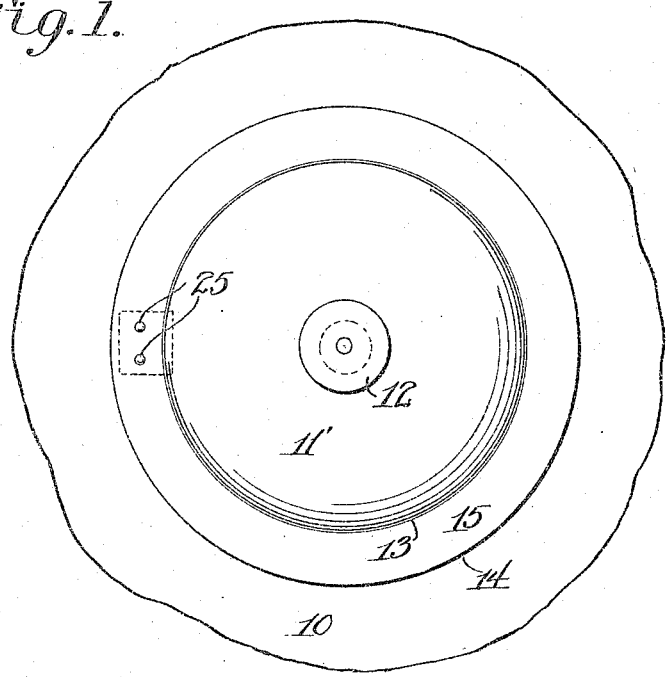
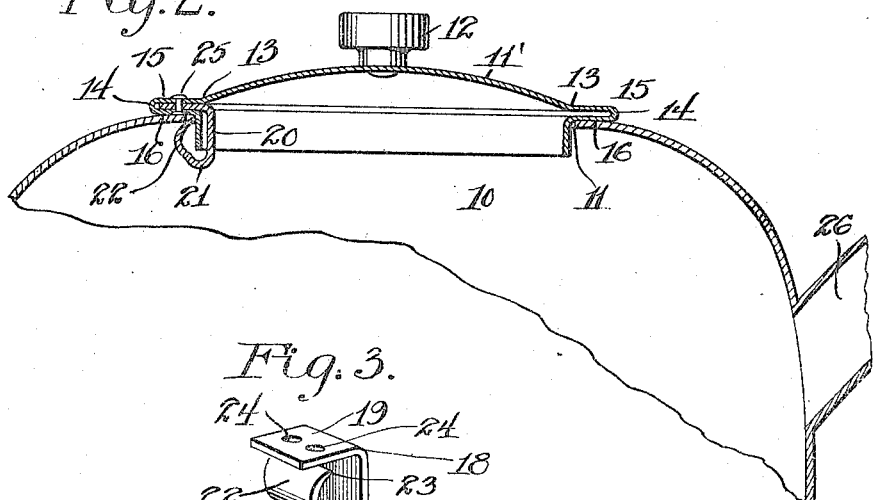
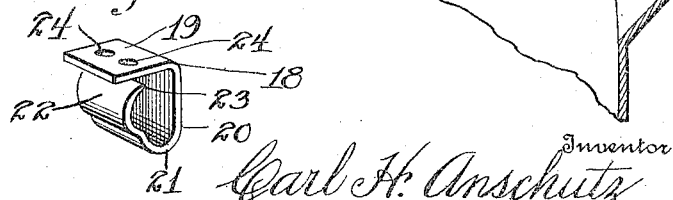
Witnesses
W. B. Mulligan
J. Reaney Kelly
Inventor
Carl H. Anschutz
By Richard B. Owen
Attorney

UNITED STATES PATENT OFFICE.

CARL H. ANSCHUTZ, OF WILSON, KANSAS.

LID FOR COOKING UTENSILS AND RETAINING DEVICE THEREFOR.

1,207,699.     Specification of Letters Patent.     Patented Dec. 12, 1916.

Application filed May 1, 1915. Serial No. 25,283.

*To all whom it may concern:*

Be it known that I, CARL H. ANSCHUTZ, a citizen of the United States, residing at Wilson, in the county of Ellsworth and State of Kansas, have invented certain new and useful Improvements in Lids for Cooking Utensils and Retaining Devices Therefor, of which the following is a specification.

This invention relates to lids for cooking utensils and retaining means therefor; such retaining means being designed to prevent displacement of the lid when the contents of the utensil are being poured.

The principal object of the invention is to provide an improved lid and retaining means such as above set forth which may be used in connection with cooking utensils of conventional form and which is so constructed whereby it will not increase the cost of manufacture of the cooking utensil to any material extent.

Various other objects and advantages will become apparent during the continuance of the following description.

The above and other objects are accomplished by such means as are illustrated in their preferred form in the accompanying drawings, described in the following specification and more specifically pointed out in the appended claims.

In the drawings wherein like characters designate like parts throughout the several views; Figure 1 is a fragmentary view illustrating a portion of a receptacle body and lid and my invention in conjunction therewith. Fig. 2 is a horizontal sectional view of a portion of a receptacle body and lid, my invention also being shown in conjunction therewith. Fig. 3 is a perspective view of my improved retaining device.

In the drawings I have shown a portion of a receptacle body 10, which is provided with the usual cover receiving aperture 11. A lid structure is also shown which consists generally, of a back portion 11' which, forms a body element; the handle member 12 being arranged thereon as shown, to facilitate operation. The perimetral edge of the body element is bent at the points indicated by the numerals 13 and 14 to form spaced apart rim flanges 15 and 16 which are in parallelism. In turn, the inner circumferential edge of the lower element 16 merges into a depending collar 17 which normally lies in the interior of the receptacle body and serves to prevent the accidental lateral dislodgment of the lid structure, in ordinary circumstances.

It will now be understood that the lid structure that has been illustrated may be formed of a single section of material and easily and quickly bent to attain its desired form. However, in view of the fact that this does not form the material part of the present invention the advantages of this structure will not be emphasized.

In forming the retaining device, an elongated section of resilient material is provided and bent at a point 18 to form a body or parent portion 19 and a depending element 20. The material is again bent at a point adjacent the lower terminus of the element 20 to form a substantially semi-circular portion 21 which in turn merges into the upstanding suitably curved retaining lip 22. Here it will be noted that the upper edge 23 of the lip is normally spaced from the lower face of the body portion 13 thus facilitating the attachment of the device to the lid structure in the manner presently described.

In attaching the retaining device to the lid, the body portion thereof is interposed between the flanges 15 and 16 and fastened securely in place by means such as shown at 25. Simultaneously with the positioning of the portion 19 between the flanges 15 and 16, the retaining lip 22 is disposed outwardly, of, the depending flange of the lid such as clearly shown in Fig. 2, its free edge bearing against the flange adjacent to the juncture thereof with the lower lid flange 16. When the retaining device assumes this position it does not in any way detract from the compactness of the lid nor does it render the lid cumbersome in any way.

When the lid is arranged on the cooking utensil, in its usual position, as shown in Fig. 2, the curved retaining lip 22 bears against that portion of the utensil immediately adjacent the lid aperture, and not only serves to prevent accidental displacement of the lid at that immediate point but it also forces the lid, or rather the depending flange thereof, firmly against the wall of the lid aperture thus, in fact, holding the lid firmly throughout the circumference of the depending flange. It is possible, of course that the retaining device be arranged in connection with the lid aperture of the cooking utensil at a portion approximately diametrically opposite the spout 26 of the utensil, but in view of the fact that the retaining device causes a binding between the depending flange of the lid and the wall of the lid aperture at points opposite to the retaining device, the operator does not have to take pains in positioning the retaining device in this manner.

From the foregoing it will be appreciated that my invention is exceedingly simple in construction and that the same may be constructed of a single section of material and therefore its application will not increase the cost of the entire receptacle to any material extent.

In reducing my invention to practice, I have found that the form referred to herein as the preferred embodiment, is the most efficient; yet realizing that certain conditions will necessarily vary in concurrence with the adoption of my device, I desire to emphasize the fact that various minor changes in the details of construction and proportion of parts may be resorted to when required without departing from the spirit or scope of my invention as defined in the appended claims.

Having thus fully described my invention, what I claim as new and desire to secure by Letters Patent is:

1. A lid retaining device comprising in combination with a detachable lid structure having a depending flange, a structure mounted on the lid and depending in parallelism to the inner face of said depending flange, and said structure provided with a resilient extension to project below the lower edge of said flange to normally bear against the outer face thereof at a point adjacent the juncture of the flange with the lid structure, as and for the purpose specified.

2. A lid retaining device including in combination with a lid structure having a depending insert flange, a structure fixed to the lid structure and depending therefrom in parallelism to the inner face of said flange, the lower end portion of said structure being bent to project beneath the lower edge of said flange, and a curved extension on said structure having its free edge engaging the outer face of said flange at a point adjacent its juncture with said lid structure, as and for the purpose specified.

3. A lid retaining device including in combination with a lid structure, a member carried by said lid structure, a portion of said member depending from said lid structure, the lower end of said member being curved to extend beneath said depending flange and an extension on said last mentioned curved portion arcuately curved when viewed in cross section and having its free edge opposed to said depending portion, as and for the purpose specified.

4. A lid retaining device including in combination with a lid structure having a depending flange, of a member carried by said lid structure, a portion of said member depending to lie in close proximity to the inner face of said flange, and an extension on said member bent to have its free edge engaged with the outer face of said flange to oppose said depending portion, as and for the purpose specified.

5. In a device of the character described, the combination with a lid structure consisting of a body portion bent at its terminal edge to form spaced apart rim flanges, a flange member depending from the lower one of said flanges to lie in spaced relation with the terminal edge of said body portion, of a retaining device having one end disposed between said flanges, means connecting said retaining device and said flanges, the body portion being bent to project beneath the lower edge of said last mentioned flange, and an extension on said last mentioned body portion arcuate when viewed in cross section having its free edge normally bearing against the outer face of said last mentioned flange at a point adjacent the juncture thereof with the lower of said first mentioned flanges to form a retaining shoulder, as and for the purpose specified.

In testimony whereof I affix my signature in presence of two witnesses.

CARL H. ANSCHUTZ.

Witnesses:
DAVID W. SOCOLOFSKY,
T. S. PERCIVAL.

Copies of this patent may be obtained for five cents each, by addressing the "Commissioner of Patents, Washington, D. C."